United States Patent
Katraro et al.

(10) Patent No.: US 7,283,350 B2
(45) Date of Patent: Oct. 16, 2007

(54) SURFACE MOUNT CHIP CAPACITOR

(75) Inventors: Reuven Katraro, Rishon-Letzion (IL); Lilia Kushnarev, Rishon-Letzion (IL); Nissim Cohen, Tivon (IL); Haim Goldberger, Modi'in (IL)

(73) Assignee: Vishay Sprague, Inc., Sanford, ME (US)

( * ) Notice: Subject to any disclaimer, the term of this patent is extended or adjusted under 35 U.S.C. 154(b) by 130 days.

(21) Appl. No.: 11/293,673

(22) Filed: Dec. 2, 2005

(65) Prior Publication Data

US 2007/0127189 A1  Jun. 7, 2007

(51) Int. Cl.
*H01G 9/00* (2006.01)

(52) U.S. Cl. ............... 361/523; 361/525; 361/528; 361/529; 361/516; 361/508; 29/25.01; 29/25.03

(58) Field of Classification Search ............... 361/523, 361/525, 528, 529, 530, 534, 508–512, 516–519; 29/25.01, 25.03
See application file for complete search history.

(56) References Cited

U.S. PATENT DOCUMENTS

| | | | |
|---|---|---|---|
| 6,380,577 B1 * | 4/2002 | Cadwallader | 257/298 |
| 6,449,140 B1 * | 9/2002 | Sakai et al. | 361/532 |
| 6,529,366 B2 * | 3/2003 | Nakamura | 361/523 |
| 6,791,822 B2 * | 9/2004 | Kochi et al. | 361/523 |
| 7,085,127 B2 * | 8/2006 | Goldberger et al. | 361/523 |
| 7,144,432 B2 * | 12/2006 | Nakamura | 29/25.03 |
| 2003/0099084 A1 | 5/2003 | Duva | |
| 2005/0195558 A1 | 9/2005 | Goldberger et al. | |

FOREIGN PATENT DOCUMENTS

EP    1 505 611 A2    2/2005

OTHER PUBLICATIONS

PCT/US2006/031123 International Search Report, Vishay Sprague, Inc., filed Oct. 8, 2006, pp. 1-6.

* cited by examiner

*Primary Examiner*—Nguyen T. Ha
(74) *Attorney, Agent, or Firm*—McKee, Voorhees & Sease, P.L.C.

(57) ABSTRACT

A surface mount chip capacitor includes a metal substrate, a conductive powder element including a valve metal and partially surrounding the metal substrate with the metal substrate extending outwardly from the conductive powder towards the anode end of the surface mount chip capacitor, a silver body cathode at least partially surrounding the conductive powder element, a coating formed by vapor-phase deposition surrounding the silver body cathode, an insulative material formed about a portion of the substrate extending outwardly from the conductive powder, a conductive coating formed around the metal substrate at the anode end of the surface mount chip capacitor, an end termination anode electrically connected to the conductive coating at the anode end of the surface mount chip capacitor, and an end termination cathode electrically connected to the silver body cathode at the cathode end of the surface mount chip capacitor.

24 Claims, 2 Drawing Sheets

SURFACE MOUNT CHIP CAPACITOR

BACKGROUND OF THE INVENTION

The present invention relates to capacitors. More particularly, but not exclusively, the present invention relates to an improved surface mount chip capacitor and methods for manufacturing the same. One example of a surface mount chip capacitor is disclosed in U.S. Published Patent Application No. 2005/0195558, herein incorporated by reference in its entirety.

BRIEF SUMMARY OF THE INVENTION

Therefore, it is a primary object, feature, or advantage of the present invention to improve over state of the art by providing an improved surface mount capacitor and method for making the same.

It is a further object, feature, or advantage of the present invention is to provide a surface mount capacitor which uses a conductive powder.

Another object, feature, or advantage of the present invention is to provide a surface mount capacitor which uses a conformal coating, such as parylene, to provide uniform coating without voids.

Yet another object, feature, or advantage of the present invention is to provide a surface mount capacitor that uses a metal coating on a metal substrate at the anode end.

Another object, feature or advantage of the present invention is to provide a conformed coating that can be used in various types of tantalum capacitors.

One or more of these and/or other objects, features, or advantages of the present invention will become apparent from the specification and claims that follow.

According to one aspect of the present invention, a surface mount chip capacitor has a cathode end and an opposite anode end. The surface mount chip capacitor includes a metal substrate and a conductive powder element comprising a valve metal and partially surrounding the metal substrate with the metal substrate extending outwardly from the conductive powder towards the anode end of the surface mount chip capacitor. The valve metal may be in a pure form or as an oxide or sub-oxide or any combination thereof. Preferably, the powder is electrophoretically deposited upon the metal substrate. Sintering is then performed and a dielectric anode is formed. A PTFE washer is preferably placed around the metal substrate. The cathode is then impregnated with $MnO_2$ or a conductive polymer. A graphite layer is formed on the cathode body and a silver cathode body is formed which at least partially surrounds the conductive powder element. A conformal coating surrounds the silver body cathode. Preferably, the conformal coating is a polymer formed by vapor-phase deposition and polymerization, such as a parylene.

Optionally the anode end can be plated such as through Au plating. The plating may be Ni, Cu, Ag, Ru, Pt, Sn, Al or a combination thereof. The surface mount chip capacitor also includes an end termination anode electrically connected to the conductive coating at the anode end of the surface mount chip capacitor and an end termination cathode electrically connected to the silver body cathode at the cathode end of the surface mount chip capacitor. Standard anode, cathode termination processes may be used.

According to another aspect of the present invention, a surface mount chip capacitor, the surface mount chip capacitor includes a metal substrate, a conductive powder element comprising a valve metal and partially surrounding the metal substrate with the metal substrate extending outwardly from the conductive powder towards the anode end of the surface mount chip capacitor, a cathode at least partially surrounding the conductive powder element, a conformal coating formed by vapor-phase deposition surrounding the silver body cathode, an insulative material formed about a portion of the substrate extending outwardly from the conductive powder, a conductive coating formed around the metal substrate at the anode end of the surface mount chip capacitor, an end termination anode electrically connected to the conductive coating, and an end termination cathode electrically connected to the cathode. Preferably the conformal coating is a polymer formed by vapor-phase deposition and polymerization, such as a parylene.

According to another aspect of the invention, a method of creating a surface mount capacitor is provided. The method includes providing a metal substrate. A conductive powder element is formed around the metal substrate such that the conductive powder element partially surrounds the metal substrate with the metal substrate extending outwardly from the conductive powder at the anode end of the surface mount capacitor. Sintering occurs and a dielectric layer is formed. A PTFE washer is then placed on the metal substrate. Cathode impregnation of $MnO_2$ or a conductive polymer then occurs. A graphite layer followed by a silver body cathode layer, are then preferably applied to a portion of the outer surface of the conductive powder element. Next a conformal coating is applied to an outer surface of the cathode layer. The conformal coating is preferably applied by vapor deposition and is preferably parylene. A metal coating is applied to a portion of the metal substrate extending beyond the conformal coating at the anode end of the surface mount capacitor. Then an anode layer of conductive material at the anode end of the surface mount capacitor, and a cathode layer of conductive material is applied at the cathode end of the surface mount capacitor.

According to another aspect of the invention, a tantalum capacitor includes a capacitory body, a tantalum element disposed within the capacitory body, a cathode at least partially surrounding the tantalum element, and a coating surrounding the cathode, the coating comprising a parylene or a parylene derivative. The tantalum capacitor need not be a surface mount capacitor.

DETAILED DESCRIPTION OF THE PREFERRED EMBODIMENT

Figure 1:
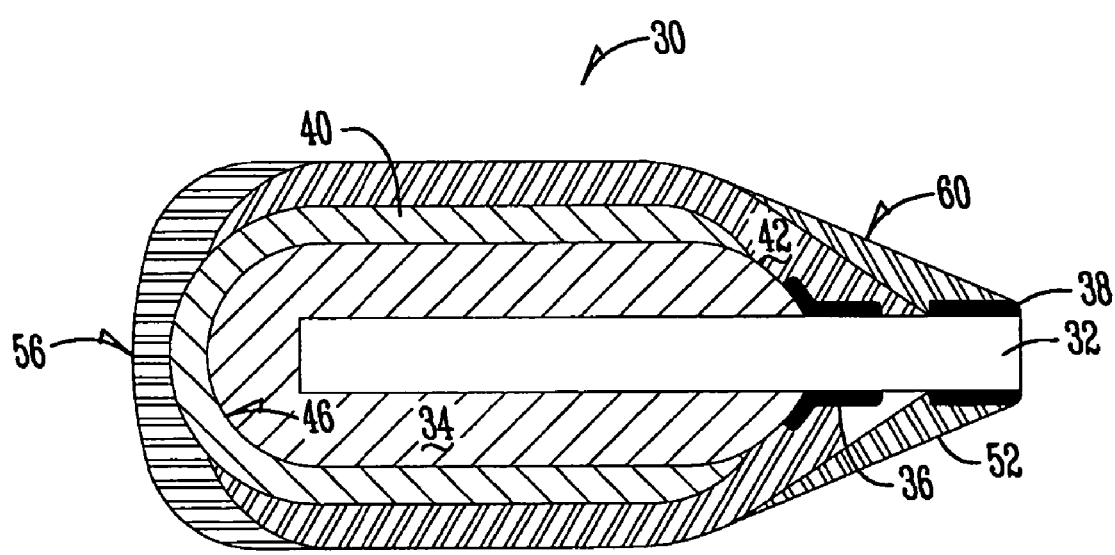
FIG. 1 is a side cross sectional view of a surface mount capacitor according to one embodiment of the present invention.

FIG. 1 shows a surface mount capacitor 30 according to one embodiment of the present invention. The surface mount capacitor can vary in size and thickness, but preferably the surface mount capacitor 30 is 10 micrometers in thickness or greater. The capacitor 30 includes a metal substrate 32. The metal substrate 32 is preferably comprised of a valve metal or a mixture of valve metals. Examples of valve metals include metals such as Tantalum (Ta), Niobium (Nb), Hafnium (Hf), Zirconium (Zr), Titanium (Ti), Vanadium (V), Tungsten (W), Beryllium (Be), and Aluminum (Al). The metal substrate 32 may be of any shape and geometry. The metal substrate 32 is preferably 5 micrometers or thicker. The metal substrate 32 may be a wire, a foil, a sheet. The metal substrate 32 may be of any number of shapes or configurations.

A conductive powder 34 is shown which surrounds the metal substrate 32. The conductive powder 34 may be a valve metal, metal oxide, sub-oxide of the metal, and any mixture thereof. For example, the conductive powder 42 can be made of Nb, NbO, TaO, $Ta_2O_5$, $Nb_2O_5$, or any combination thereof. Alternatively, the conductive powder 34 may be a mixture of valve metals or a composition containing a valve metal. The conductive powder 34 may have a low capacitor-voltage (CV) (i.e. 10 CV) or a greater CV, including a CV greater than 150 KCV. The conductive powder 34 before being placed upon the metal substrate 32 may be in a form of a powder that is regularly agglomerated, sieved, and/or crushed. The thickness of the conductive powder 34 is preferably 1 micrometer or thicker.

A silver body cathode 40 is shown which surrounds the conductive powder 34. The silver body cathode 40 may be formed of a silver bearing paste via printing or through other types of conventional construction.

A conformal coating 42 of a material such as parylene is formed by vapor deposition on the silver body cathode 40. The thickness of the conformal coating 42 is preferably 4 micrometers or greater. Where parylene is used as the conformal coating 42, any type may be used, including C, D, N, H, F and T. The conformal coating 42 is made by any appropriate vapor reactor deposition process. Preferably, the conformal coating 42 provides uniform thickness without voids. Parylene also provides for good dielectric strength.

An insulator 36 of a material such as PolyTetraFluoroEthylene (PTFE) is used. One example of such a material is DuPont TEFLON. An insulator 36 formed by a PTFE washer is operatively connected to a portion of the metal substrate 32 extending from the conductive powder 34.

A conductive coating 38 of a material such as nickel (Ni), gold (Au), Silver (Ag), Copper (Cu), Platinum (Pt), Ruthenium (Ru), Aluminum (Al), Tin (Sn), or Iron (Fe) coats a portion of the metal substrate 32 extending beyond the conformal coating layer 42. The conductive coating 38 can be any metal. The conductive coating 38 is positioned at the anode end of the capacitor 30.

An anode end termination 60 such as one of conventional design is placed at the anode end of the capacitor and in electrical contact with the conductive coating 38 which is in electrical contact with the metal substrate 32. A cathode end termination 56 is in electrical contact with the silver body cathode 40. The cathode terminal 56 and the anode terminal 60 are connections that can be connected to a circuit board for mounting the capacitor 30 in an electrical circuit. Alternatively, the chip capacitor 30 may provide for termination at the same end.

The present invention also provides for a method of creating a surface mount capacitor 30 having an anode end and a cathode end opposite the anode end. A metal substrate 32 is provided. A conductive powder element 34 is formed around the metal substrate 32 such that the conductive powder element 34 partially surrounds the metal substrate 32 with the metal substrate 32 extending outwardly from the conductive powder 34 at the anode end of the surface mount capacitor 30. Next, a dielectric layer is formed on the conductive powder. Next, cathode impregnation such as $MnO_2$ or conductive polymer is formed within the powder voids and a cathode layer 46, such as a silver body cathode layer is applied to a portion of the outer surface of the conductive powder element 34. The insulator 36 such as a TEFLON washer can then be placed on the metal substrate 32. Next a conformal coating 42 is applied to an outer surface of the cathode layer. The conformal coating 42 is preferably applied by vapor deposition and is preferably parylene. A metal coating 38 is applied to a portion of the metal substrate 32 extending beyond the conformal coating 42 at the anode end of the surface mount capacitor 30. Then an anode layer 60 of conductive material is applied at the anode end of the surface mount capacitor 30, and a cathode layer 56 of conductive material is applied at the cathode end of the surface mount capacitor 30. It is to be understood that various of these steps may be performed in different order as may be appropriate in a particular manufacturing process or environment.

Figure 2:
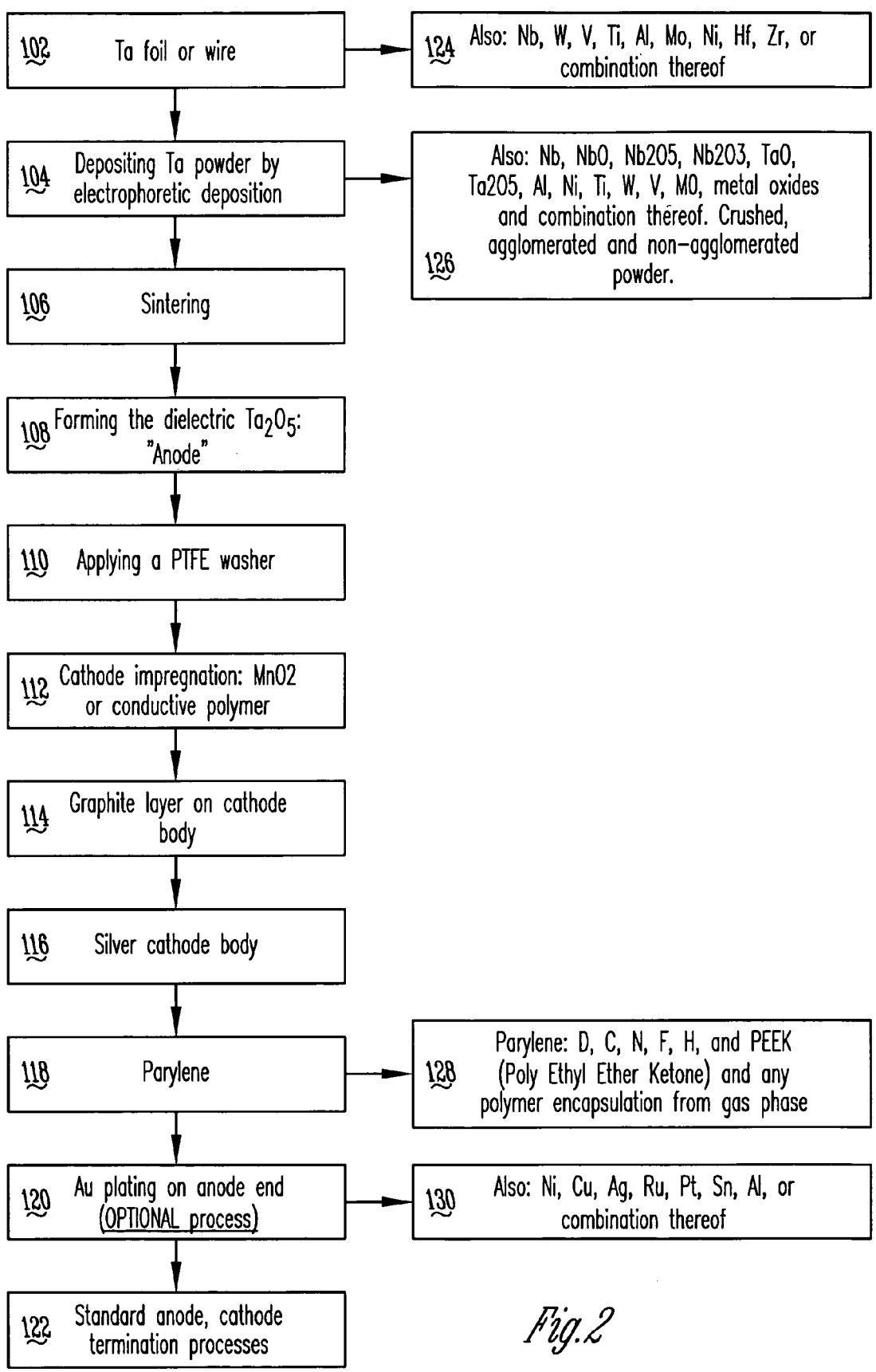
FIG. 2 is a flow diagram showing one embodiment of the present invention.

FIG. 2 illustrates one embodiment of the methodology. In step 102 tantalum foil or wire is preferably provided. In step 104 tantalum powder is deposited by electrophoretic deposition. In step 106 sintering is provided. Step 108 provides for forming the dielectric $Ta_2O_5$ "anode". Step 110 provides for applying a PTFE washer 110. Step 112 provides for cathode impregnation. Either $MnO_2$ or a conductive polymer is used. Step 114 provides for a graphite layer on the cathode body. Step 116 provides for the silver cathode body. Step 118 provides for applying the parylene. In step 120 an optional process of applying Au plating on the anode body is shown. In step 122 standard anode, cathode termination processes are used.

Steps 124, 126, 128, and 130 illustrate some of the variations that can be used. For example, in step 124, Nb, W, V, Ti, Al, Mo, Ni, Hf, Zr or a combination thereof is used. In step 126, instead of tantalum powder, Nb, NbO, $Nb_2O_5$, $Nb_2O_3$, TaO, $Ta_2O_5$, Al, Ni, Ti, W, V, Mo, metal oxides and combinations thereof can be used. Crushed, agglomerated and non-agglomerated powder can be used. In step 128, the parylone used may be D, L, N, F, H, or PEEK (poly ethyl ether ketone) and any polymer encapsulation from gas phase. In step 130, Ni, Cu, Ag, Ru, Pt, Sn, Al, or any combination thereof is used for plating.

While the present invention can be accomplished using the methods described above, it is understood that various other methods could be used within the spirit and scope of the present invention.

What is claimed is:

1. A surface mount chip capacitor having a cathode end and an opposite anode end, the surface mount chip capacitor, comprising:
    a metal substrate;
    a conductive powder element comprising a valve metal and partially surrounding the metal substrate with the metal substrate extending outwardly from the conductive powder towards the anode end of the surface mount chip capacitor;
    a dielectric layer, an impregnated cathode and a silver body cathode at least partially surrounding the conductive powder element;
    a coating surrounding the silver body cathode;
    an insulative material formed about a portion of the substrate extending outwardly from the conductive powder;
    a conductive coating formed around the metal substrate at the anode end of the surface mount chip capacitor;
    an end termination anode electrically connected to the conductive coating at the anode end of the surface mount chip capacitor; and
    an end termination cathode electrically connected to the silver body cathode at the cathode end of the surface mount chip capacitor.

2. The surface mount chip capacitor of claim 1 wherein the coating is a polymer formed by vapor-phase deposition and polymerization.

3. The surface mount chip capacitor of claim 2 wherein the coating comprises parylene.

4. The surface mount chip capacitor of claim 2 wherein the coating comprises a parylene derivative.

5. The surface mount chip capacitor of claim 3 wherein the valve metal of the conductive powder is tantalum.

6. The surface mount chip capacitor of claim 1 wherein the powder has been electrophoretically deposited upon the metal substrate.

7. The surface mount chip capacitor of claim 1 wherein the metal substrate is a tantalum foil.

8. The surface mount chip capacitor of claim 1 wherein the surface mount chip capacitor has a thickness of at least 10 micrometers.

9. The surface mount chip capacitor of claim 1 wherein the conductive powder provides a capacitor-voltage of at least 10 CV.

10. The surface mount chip capacitor of claim 1 wherein the conductive powder comprises the valve metal as a metal oxide.

11. The surface mount chip capacitor of claim 1 wherein the conductive powder comprises the valve metal as a metal suboxide.

12. The surface mount chip capacitor of claim 1 wherein the valve metal is Niobium and the conductive powder comprises Nb, NbO, and $Nb_2O_5$.

13. A surface mount chip capacitor, the surface mount chip capacitor, comprising:
a metal substrate;
a conductive powder element comprising a valve metal and partially surrounding the metal substrate with the metal substrate extending outwardly from the conductive powder towards the anode end of the surface mount chip capacitor;
a cathode at least partially surrounding the conductive powder element;
a coating surrounding the cathode;
an insulative material formed about a portion of the substrate extending outwardly from the conductive powder;
a conductive coating formed around the metal substrate at the anode end of the surface mount chip capacitor;
an end termination anode electrically connected to the conductive coating; and
an end termination cathode electrically connected to the cathode.

14. The surface mount chip capacitor of claim 13 wherein the coating is a polymer formed by vapor-phase deposition and polymerization.

15. The surface mount chip capacitor of claim 14 wherein the coating comprises parylene.

16. The surface mount chip capacitor of claim 14 wherein the coating comprises a parylene derivative.

17. The surface mount chip capacitor of claim 14 wherein the valve metal of the conductive powder is tantalum.

18. The surface mount chip capacitor of claim 14 wherein the powder has been electrophoretically deposited upon the metal substrate.

19. A method of creating a surface mount capacitor leaving an anode end and a cathode end opposite the anode end, the method comprising:
providing a metal substrate;
forming a conductive powder element around the metal substrate such that the conductive powder element partially surrounds the metal substrate with the metal substrate extending outwardly from the conductive powder at the anode end of the surface mount capacitor;
impregnating the anode body;
applying a silver body cathode layer to a portion of an outer surface of the conductive powder element;
applying a coating to an outer surface of the silver body cathode layer;
applying a metal coating to a portion of the metal substrate extending beyond the coating at the anode end of the surface mount capacitor;
applying an anode layer of conductive material at the anode end of the surface mount capacitor; and
applying a cathode layer of conductive material at the cathode end of the surface mount capacitor.

20. The method of claim 19 wherein the step of applying the coating is applying the coating by vapor deposition.

21. The method of claim 20 wherein the conformal coating comprising a parylene.

22. The method of claim 19 wherein the coating comprises a parylene derivative.

23. A tantalum capacitor comprising:
a capacitor body;
a tantalum element disposed within the capacitor body;
a dielectric layer formed on the tantalum element;
a cathode at least partially surrounding the tantalum element;
a coating surrounding the cathode, the coating comprising a parylene or a parylene derivative.

24. The tantalum capacitor of claim 23 wherein the coating is formed by vapor-phase deposition and polymerization.

* * * * *